US011241936B2

(12) United States Patent
Min et al.

(10) Patent No.: US 11,241,936 B2
(45) Date of Patent: Feb. 8, 2022

(54) AIR CONDITIONER FOR VEHICLE AND CONTROL METHOD THEREOF

(71) Applicant: HANON SYSTEMS, Daejeon (KR)

(72) Inventors: Se Won Min, Daejeon (KR); Tae Eun Kim, Daejeon (KR); Chang Hyun Baek, Daejeon (KR); Sang Jun Yoo, Daejeon (KR); Hong Rae Jung, Daejeon (KR); Chul Soon Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 781 days.

(21) Appl. No.: 15/796,901

(22) Filed: Oct. 30, 2017

(65) Prior Publication Data

US 2018/0117989 A1    May 3, 2018

(30) Foreign Application Priority Data

Oct. 31, 2016 (KR) .................. 10-2016-0142876
Oct. 17, 2017 (KR) .................. 10-2017-0134355

(51) Int. Cl.
*B60H 1/00* (2006.01)
*B60H 1/04* (2006.01)

(52) U.S. Cl.
CPC ..... *B60H 1/00835* (2013.01); *B60H 1/00807* (2013.01); *B60H 1/00892* (2013.01); *B60H 1/00964* (2013.01); *B60H 1/04* (2013.01); *B60H 2001/00733* (2019.05)

(58) Field of Classification Search
CPC ............ B60H 1/00835; B60H 1/00807; B60H 1/00892; B60H 1/00964; B60H 1/04; B60H 2001/00733; B60H 2001/3478; B60H 1/00828; B60H 1/00642; B60H 1/0073; B60H 1/00735; B60H 1/00857
USPC .................................. 454/75; 700/278, 276
See application file for complete search history.

(56) References Cited

U.S. PATENT DOCUMENTS

2015/0273982 A1* 10/2015 Takata ............... B60H 1/00828
                                                                701/48
2016/0046171 A1*  2/2016 Xia .................... B60H 1/00064
                                                                165/203
2017/0305229 A1* 10/2017 Spryshak ........... B60H 1/00564

FOREIGN PATENT DOCUMENTS

JP           3918546 B2    5/2007

* cited by examiner

*Primary Examiner* — Kenneth J Hansen
*Assistant Examiner* — Ryan L Faulkner
(74) *Attorney, Agent, or Firm* — Dickinson Wright PLLC

(57) ABSTRACT

The present invention relates to an air conditioner for a vehicle and a control method thereof, which can calculate the range of discharge temperature to the interior of the vehicle, set the upper limit of the discharge temperature, and control the degree of opening of a temp door such that the discharge temperature to the interior of the vehicle gets lower than the upper limit, thereby preventing air of discharge temperature above the upper limit from being discharged to the interior of the vehicle and preventing displeasure or personal injury that may be caused when air of high temperature is discharged.

6 Claims, 3 Drawing Sheets

PRIOR ART

AIR CONDITIONER FOR VEHICLE AND CONTROL METHOD THEREOF

CROSS-REFERENCE TO RELATED APPLICATIONS

This application claims the benefit and priority of Korean Application No. 10-2016-0142876 filed Oct. 31, 2016 and Korean Application No. 10-2017-0134355 filed Oct. 17, 2017. The entire disclosures of each of the above applications are incorporated herein by reference.

BACKGROUND OF THE INVENTION

Field of the Invention

The present invention relates to an air conditioner for a vehicle and a control method thereof, and more particularly, to an air conditioner for a vehicle and a control method thereof, which can calculate the range of discharge temperature to the interior of the vehicle, set the upper limit of the discharge temperature, and control the degree of opening of a temp door such that the discharge temperature to the interior of the vehicle gets lower than the upper limit, thereby preventing air of discharge temperature above the upper limit from being discharged to the interior of the vehicle and preventing displeasure or personal injury that may be caused when air of high temperature is discharged.

Background Art

This section provides background information related to the present disclosure which is not necessarily prior art.

In general, with the trend of gentrification, air conditioning effects at high technology for creating more agreeable environment are being demanded of an air conditioner for a vehicle, which is installed inside the vehicle. One of such efforts is to introduce a full automatic temperature control (FATC) system.

An air conditioner capable of full automatic temperature control (FATC) automatically controls cooling, heating, ventilation and air-conditioning of the air conditioner using a microcomputer (control unit) programmed to make passengers feel comfortability. The FATC air conditioner autonomously operates according to desired temperature set by a user without any manipulation during driving. The FATC air conditioner is operated when an auto button is manipulated, and carries out feedback controls of a blower motor, an air-conditioner compressor, an indoor and outdoor air door actuator, a temp door actuator, an mode door actuator and so on according to signal inputs of various sensors, such as an indoor and outdoor air temperature sensor, a daylight sensor, a cooling water temperature sensor, an evaporator sensor and so on, so as to perform air-conditioning modes at proper temperature.

That is, as shown in FIG. 1, the FATC air conditioner calculates a thermal load of the interior of the vehicle according to sensor feedback values, such as outdoor temperature, indoor temperature, a value of solar radiation and so on, and controls the degree of opening of a temp door (5), an indoor and outdoor air changing door (2) mode, and air volume of a blower (1) according to a fixed thermal load value. In FIG. 1, reference sign Nos. 3, 4, and 7 show evaporator, heater core, and mode door respectively.

However, such a conventional FATC air conditioner has a disadvantage in that it may cause displeasure or burn because discharge temperature of air discharged to the interior of the vehicle increases when temperature of engine cooling water is high.

SUMMARY OF THE INVENTION

This section provides a general summary of the disclosure, and is not a comprehensive disclosure of its full scope or all of its features.

Accordingly, the present invention has been made in view of the above-mentioned problems occurring in the prior art, and it is an object of the present invention to provide an air conditioner for a vehicle and a control method thereof, which can calculate the range of discharge temperature to the interior of the vehicle, set the upper limit of the discharge temperature, and control the degree of opening of a temp door such that the discharge temperature to the interior of the vehicle gets lower than the upper limit, thereby preventing air of discharge temperature above the upper limit from being discharged to the interior of the vehicle and preventing displeasure or personal injury that may be caused when air of high temperature is discharged.

To accomplish the above object, according to the present invention, there is provided a control method of an air conditioner for a vehicle, which calculates a thermal load of the interior of the vehicle according to indoor and outdoor conditions of the vehicle and controls the degree of opening of a temp door according to a fixed thermal load value of the interior of the vehicle, including: a first step (S1) of calculating a range of discharge temperature of air discharged to the interior of the vehicle and setting an upper limit (A) of the discharge temperature; a second step (S2) of calculating a control range of the temp door; and a third step (S3) of controlling the degree of opening of the temp door such that the discharge temperature to the interior of the vehicle is lower than the upper limit (A) of the discharge temperature.

As described above, according to a preferred embodiment of the present invention, the air conditioner for a vehicle and a control method thereof can calculate the range of discharge temperature to the interior of the vehicle, set the upper limit of the discharge temperature, and control the degree of opening of a temp door such that the discharge temperature to the interior of the vehicle gets lower than the upper limit, thereby preventing air of discharge temperature above the upper limit from being discharged to the interior of the vehicle and preventing displeasure or personal injury that may be caused when air of high temperature is discharged.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, exemplary embodiments of an air conditioner for a vehicle and a control method thereof according to the present invention will be described with reference to the accompanying drawings.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
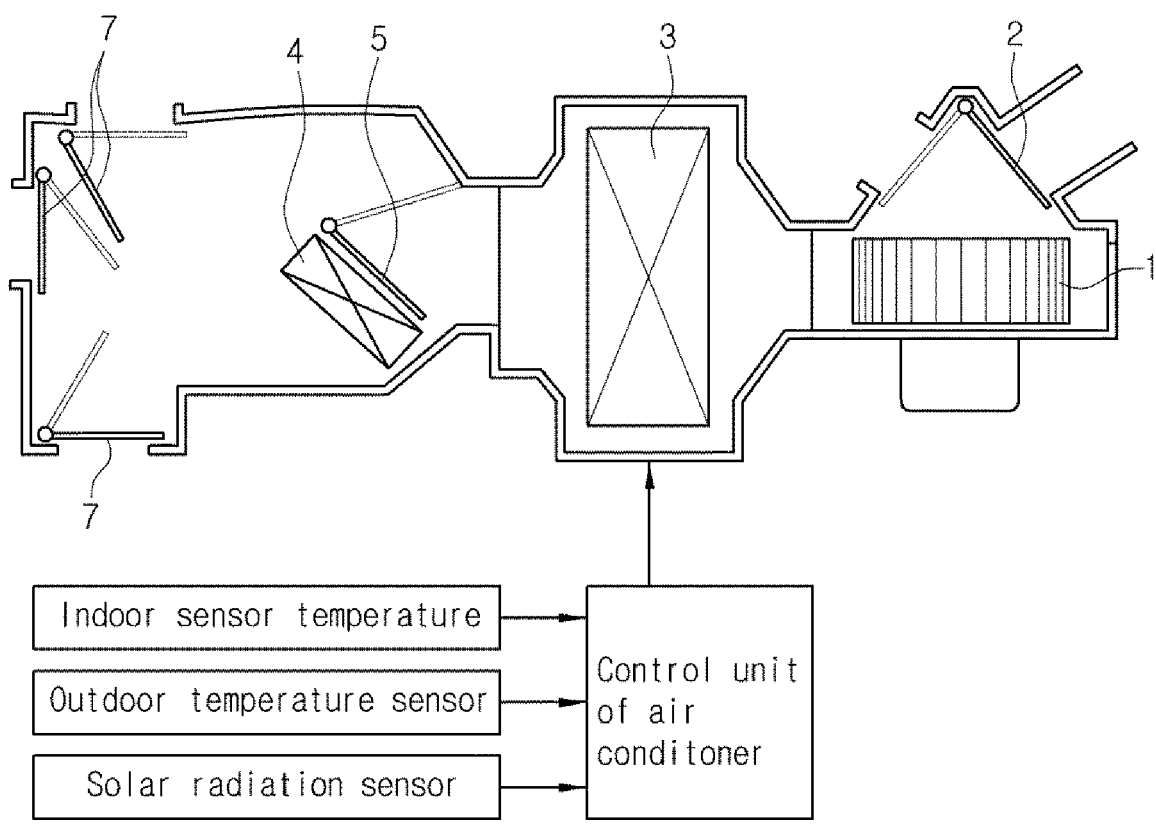
FIG. 1 is a block diagram of a conventional air conditioner for a vehicle.
Figure 2:
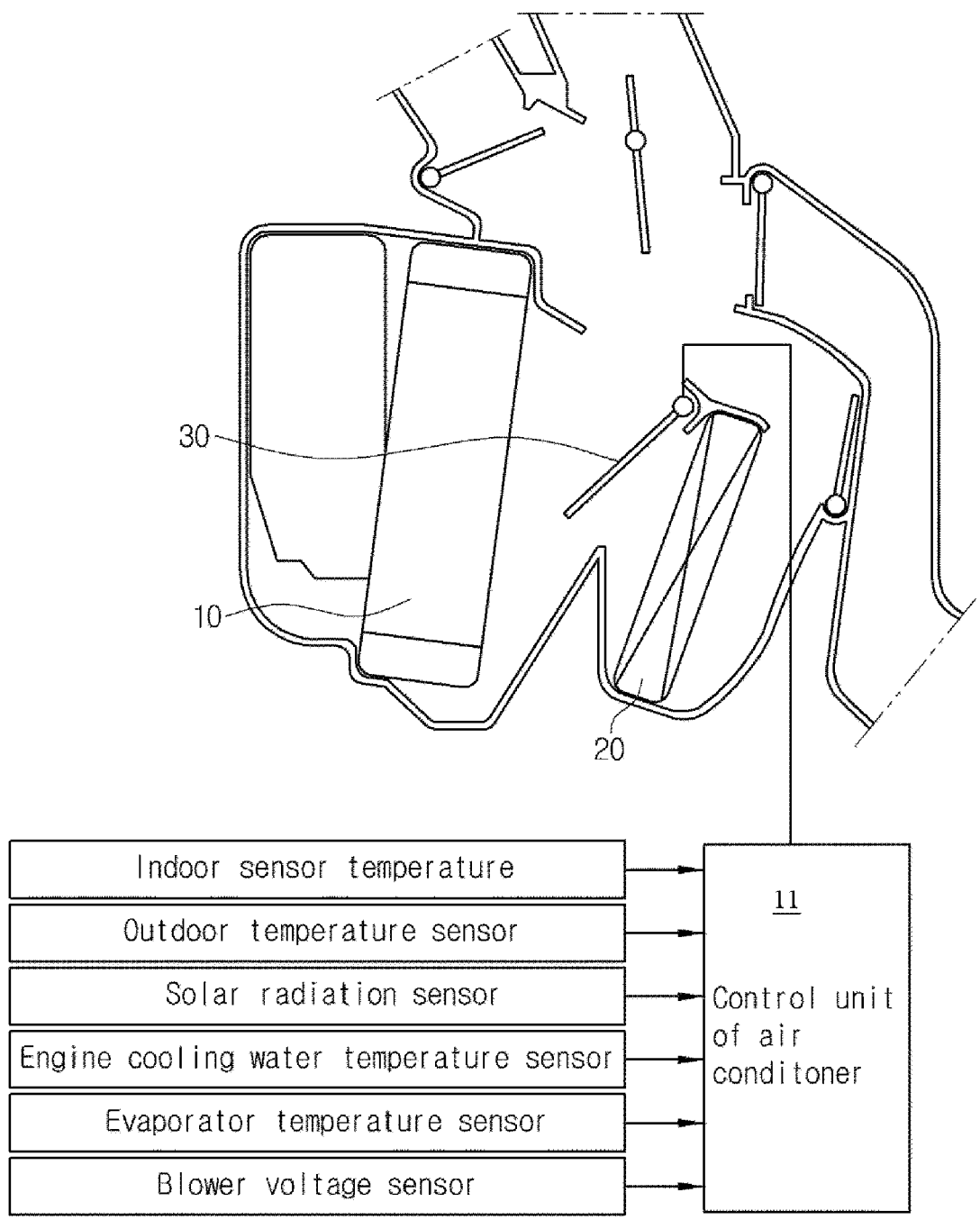
FIG. 2 is a block diagram of an air conditioner for a vehicle according to a preferred embodiment of the present invention.
Figure 3:
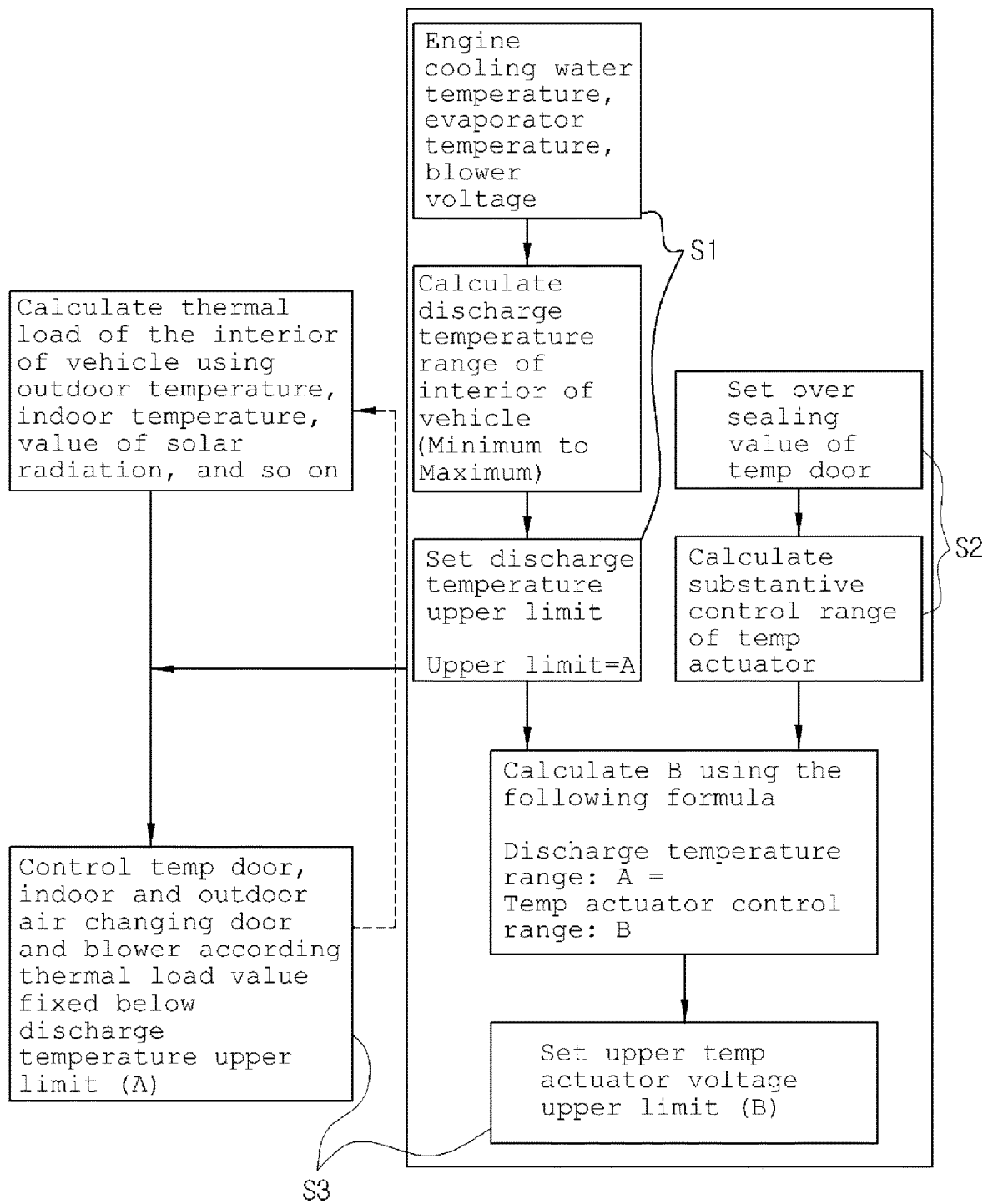
FIG. 3 is a block diagram of a control method of an air conditioner for a vehicle according to a preferred embodiment of the present invention.

With reference to FIGS. 2 and 3, an air conditioner for a vehicle according to a preferred embodiment of the present invention will be described in brief. An evaporator (10) and a heater core (20) are mounted inside the air conditioner to be spaced apart from each other, and a temp door (30) is mounted between the evaporator and the heater core to control a mixed amount of the air passing through the evaporator and the air passing through the heater core.

In this instance, a temp actuator for controlling the temp door is mounted.

The air conditioner for the vehicle includes a control unit 11. The control unit 11 sets an upper limit (A) of discharge temperature after calculating the range of the discharge temperature of air discharged to the interior of the vehicle, calculates a control range of the temp door, and controls the degree of opening of the temp door such that the discharge temperature of the air discharged to the interior of the vehicle gets lower than the upper limit (A).

When the air conditioner is operated, the control unit 11 calculates a thermal load of the interior of the vehicle according to indoor and outdoor conditions of the vehicle, and then, controls the degree of opening of the temp door according to a fixed thermal load value of the interior of the vehicle.

In more detail, the control unit 11 calculates the thermal load of the interior of the vehicle using indoor temperature, outdoor temperature, an amount of solar radiation, and so on, and controls the degree of opening of the temp door, an indoor and outdoor air changing door mode, and air volume of a blower according to the fixed thermal load value.

In this instance, it is preferable that the degree of opening of the temp door, the indoor and outdoor air changing door mode, and the air volume of the blower according to the fixed thermal load value of the interior of the vehicle be controlled within a range between the upper limit and the lower limit of the discharge temperature of the air discharged to the interior of the vehicle.

Moreover, the air conditioner for the vehicle according to the present invention sets the upper limit (A) of discharge temperature and an upper limit (B) of a temp actuator voltage in order to control that the temp actuator voltage does not exceed "B". In other words, the air conditioner for the vehicle according to the present invention controls the discharge temperature to the interior of the vehicle to be less than the upper limit (A) and controls the temp actuator voltage to be less than the upper limit (B) when the degree of opening of the temp door is controlled.

Therefore, the air conditioner for the vehicle according to the present invention can prevent air of discharge temperature above the upper limit from being discharged to the interior of the vehicle and prevent displeasure or personal injury that may be caused when air of high temperature is discharged.

Herein after, a control method of the air conditioner for the vehicle according to the preferred embodiment of the present invention will be described in detail.

First, a first step (S1) of calculating the range of discharge temperature of air discharged to the interior of the vehicle and setting an upper limit (A) of the discharge temperature is carried out.

The range of the discharge temperature to the interior of the vehicle is calculated using engine cooling water temperature, an evaporator temperature, and a blower voltage, and in this instance, the minimum temperature range to the maximum temperature range of an expected discharge temperature is calculated.

When the range of the discharge temperature to the interior of the vehicle is calculated, the upper limit (A) of the discharge temperature is set, and the upper limit (A) of the discharge temperature must be lower than the upper limit of the discharge temperature to the interior of the vehicle.

That is, when the minimum temperature range to the maximum temperature range of the discharge temperature to the interior of the vehicle is calculated, the upper limit (A) of the discharge temperature is lower than the maximum value (upper limit) in the range of the discharge temperature.

For instance, if the maximum value (upper limit) of the discharge temperature is 90° C., the upper limit (A) of the discharge temperature is set to be 80° C., which is lower than the upper limit (A) of the discharge temperature.

Next, a second step (S2) of calculating a control range of the temp door is carried out.

The control range of the temp door is a substantive control range of the temp door except an over ceiling value after setting the over sealing value of the temp door.

Here, the substantive control range of the temp door is a substantive control range of the temp actuator.

That is, the temp door has an over sealing zone. From the point that the temp door closes a cold air passageway or a warm air passageway, the temp actuator is operated additionally such that the temp door comes into close contact with a sealing surface so as to improve sealability.

As an example, if the full control range of the temp actuator is 0.3V (cooling) to 4.7V (heating), the substantive temp actuator control range except the over sealing value of the temp door will be 0.6V to 4.3V.

As described above, in the second step (S2), the over sealing value of the temp door is set, and then, the substantive control range of the temp door, namely, the substantive control range of the temp actuator is calculated.

Next, a third step (S3) of controlling the degree of opening of the temp door such that the discharge temperature to the interior of the vehicle is lower than the upper limit (A) of the discharge temperature is carried out.

In this instance, the degree of opening of the temp door is controlled to be lower than the upper limit (A) of the discharge temperature according to the fixed thermal load value of the interior of the vehicle.

In the third step (S3), the upper limit (B0 of the temp actuator voltage, which controls the temp door, is set to control the degree of opening of the temp door.

In other words, the degree of opening of the temp door is also determined within the range lower than the upper limit (B) of the temp actuator voltage, such that the discharge temperature to the interior of the vehicle becomes lower than the upper limit (A) of the discharge temperature.

In this instance, the temp actuator voltage is set not to exceed "B".

Here, the upper limit (B) of the temp actuator voltage is calculated by the following formula:

Range of discharge temperature:A=temp actuator control range:B, wherein A is the upper limit of discharge temperature, and B is the upper limit of temp actuator voltage.

The upper limit (B) of temp actuator voltage is calculated using engine cooling water temperature, evaporator temperature, and blower voltage. Furthermore, the upper limit (B) of the temp actuator voltage is formed to be less than the maximum driving voltage of the temp door by reflecting the over sealing value of the temp door.

Now, the control method of the air conditioner for the vehicle according to an embodiment of the present invention will be described in more detail.

As an example, in the maximum cooling mode (Max Cool), 0.30V is the minimum value of driving voltage, and in the maximum heating mode (Max Warm), 4.70V is the maximum value of driving voltage. In this instance, the set voltage (Temp F/B_x) of the temp actuator satisfies the following formula:

0.30≤Temp F/B_x≤TempFB_Max≤4.70, wherein TempFB_Max is the upper limit of the temp actuator voltage.

Additionally, the upper limit (TempFB_Max) of the temp actuator voltage satisfies the following formula:

TempFB_Max=0.30+α+FB_Index, wherein α is an over sealing value of the cooling side.

In addition, FB_Index satisfies the following formula:

$$FB\_Index=Temp\_Index \div Temp\_range \times Actr\_range.$$

In this instance, Temp_Index and Temp_range satisfy the following formulas:

$$Temp\_Index=Temp\_Limit-(Tevap+T\_EvaUp), \text{ and}$$

$$Temp\_range=\{(ECT-T\_HeatDown)-(Tevap+T\_EvaUp)\}.$$

Moreover, Actr_range satisfies the following formula:

$$Actr\_range=\{(4.70-\beta)-(0.30+\alpha),$$

wherein Temp_Limit is the upper limit of the range of the discharge temperature, and Tevap is evaporator temperature, ECT is cooling water temperature, and T_HeatDown is outdoor temperature. Furthermore, in the above formulas, other factors are indicated in the following Table 1 and Table 2.

TABLE 1

| | |
|---|---|
| Temp_Limit(° C.) | 80.0 |
| T_EvaUp(° C.) | 1.0 |
| T_HeatDown(° C.) | 표 2 |
| α(V) | 0.50 |
| β(V) | 0.50 |

In the above, α is an over sealing value of the cooling side, and β is an over sealing value of the warm side.

TABLE 2

| Amb(° C.) × Blower(V) | T_HeatDown(° C.) |
|---|---|
| −250 | 15.0 |
| −100 | 12.0 |
| −50 | 10.0 |
| 0 | 10.0 |
| 100 | 10.0 |
| 200 | 10.0 |

That is, the upper limit (B) of the temp actuator voltage is proportional to the value to take evaporator temperature from the upper limit of the discharge temperature range. Moreover, the upper limit (B) of the temp actuator voltage is in inverse proportion to the value to take outdoor temperature from cooling water temperature.

As described above, while the present invention has been particularly shown and described with reference to the example embodiments thereof, it will be understood by those of ordinary skill in the art that the above embodiments of the present invention are all exemplified and various changes, modifications and equivalents may be made therein without changing the characteristics and scope of the present invention. Therefore, it would be understood that the protective scope of the present invention shall be defined by the technical ideas of the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air conditioner for a vehicle, which includes a control unit for calculating a thermal load value of an interior of the vehicle using indoor temperature, outdoor temperature, an amount of solar radiation and controlling a degree of opening of a temp door according to the calculated thermal load value to control an amount of air passing over an evaporator and a heater core prior to entering the interior of the vehicle, wherein the control unit calculates a range of discharge temperature of air discharged to the interior of the vehicle, sets an upper limit (A) of the discharge temperature, calculates a control range of the temp door, controls the degree of opening of the temp door such that the discharge temperature of the air discharged to the interior of the vehicle gets lower than the upper limit (A), sets an upper limit (B) of temp actuator voltage for controlling the temp door so as to control the degree of opening of the temp door, calculates the upper limit (B) of temp actuator voltage using an engine cooling water temperature and the outside air temperature for preventing an increase in the discharge temperature discharged into the vehicle interior due to an increase of the engine cooling water temperature, and wherein the upper limit (B) of temp actuator voltage is calculated to be inversely proportional to the engine cooling water temperature minus the outside air temperature, and wherein the upper limit (B) of temp actuator voltage is formed to be less than a maximum driving voltage of the temp door and reflects an over sealing value of the temp door such that the temp door continues to operate beyond closing a warm air passageway or cold air passageway so as to improve sealability of the temp door.

2. The air conditioner according to claim 1, wherein the range of the discharge temperature to the interior of the vehicle is calculated using engine cooling water temperature, evaporator temperature, and blower voltage.

3. The air conditioner according to claim 1, wherein the upper limit (B) of temp actuator voltage is proportional to a value to take an evaporator temperature from the upper limit of the discharge temperature range.

4. A control method of an air conditioner for a vehicle, which calculates a thermal load value of an interior of a vehicle using indoor temperature, outdoor temperature, an amount of solar radiation and controls a degree of opening of a temp door according to a calculated thermal load value of the interior of the vehicle, comprising:
   a first step (S1) of calculating a range of discharge temperature of air discharged to the interior of the vehicle and setting an upper limit (A) of the discharge temperature;
   a second step (S2) of calculating a control range of the temp door; and
   a third step (S3) of controlling the degree of opening of the temp door such that the discharge temperature to the interior of the vehicle is lower than the upper limit (A) of the discharge temperature, wherein in the third step (S3), an upper limit (B) of temp actuator voltage for controlling the temp door is set so as to control the degree of opening of the temp door, and the upper limit (B) of temp actuator voltage is calculated using engine cooling water temperature and the outside air temperature for preventing an increase in the discharge temperature discharged into the vehicle interior due to an increase of the engine cooling water temperature, and wherein the upper limit (B) of temp actuator voltage is calculated to be inversely proportional to the engine cooling water temperature minus the outside air temperature;

wherein the upper limit (B) of temp actuator voltage is formed to be less than a maximum driving voltage of the temp door and reflects an over sealing value of the temp door such that the temp door continues to operate beyond closing a warm air passageway or cold air passageway so as to improve sealability of the temp door.

5. The control method according to claim 4, wherein the range of the discharge temperature to the interior of the vehicle is calculated using engine cooling water temperature, evaporator temperature, and blower voltage.

6. The control method according to claim 4, wherein in the third step (S3), the degree of opening of the temp door is controlled according to the thermal load value of the interior of the vehicle fixed below the upper limit (A) of the discharge temperature.

* * * * *